July 3, 1956

J. J. KOVACICH ET AL 2,753,082

COMBINED SALT AND PEPPER SHAKER

Filed June 12, 1951

INVENTORS
JOSEPH J. KOVACICK
and GEORGE J. JANOSKO

BY
McMorrow, Berman & Davidson
ATTORNEYS

United States Patent Office 2,753,082
Patented July 3, 1956

2,753,082

COMBINED SALT AND PEPPER SHAKER

Joseph John Kovacich and George J. Janosko, Anaconda, Mont.

Application June 12, 1951, Serial No. 231,164

3 Claims. (Cl. 222—129)

This invention relates to bottle corks or stoppers and more particularly to a vacuum bottle stopper arranged to function as a combined salt and pepper shaker as well as a bottle stopper.

It is among the objects of the invention to provide a vacuum bottle stopper which is arranged to serve as a salt and pepper shaker without loss of efficiency as a bottle stopper; which is effective to dispense salt or pepper alternatively or to preclude dispensing of either, as may be desired; which carries a supply of salt and pepper or other material in convenient association with a vacuum bottle; and which is simple and durable in construction, economical to manufacture, neat and attractive in appearance, and easy and convenient to use.

Other objects and advantages will become apparent from a consideration of the following description and the appended claims in conjunction with the accompanying drawing wherein:

Figure 1:
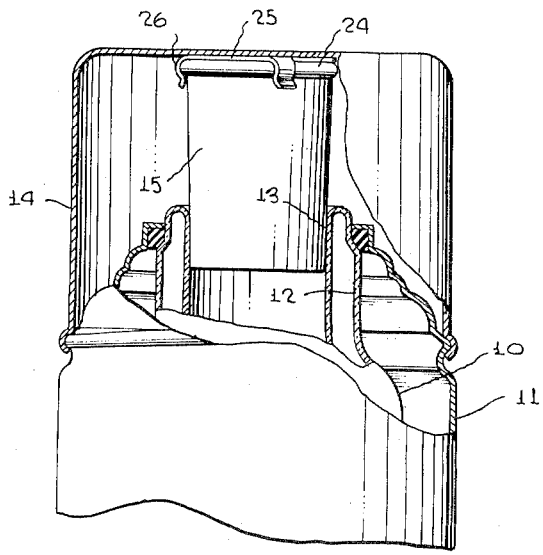
Figure 1 is a fragmentary side elevational view of a vacuum bottle and cap assembly with parts broken away and shown in cross section to illustrate a combined stopper and salt and pepper dispenser mounted in the mouth of the bottle.
Figure 2:
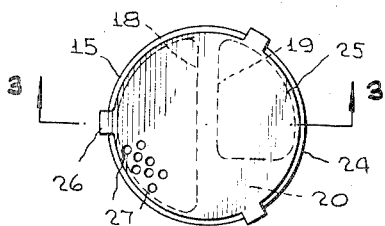
Figure 2 is a top plan view of the combined stopper and salt and pepper dispenser.
Figure 4:
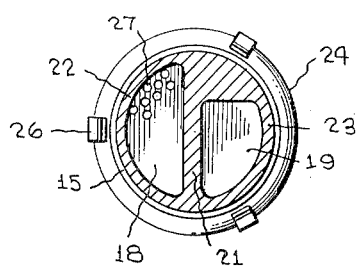
Figure 4 is a cross sectional view on the line 4—4 of Figure 3.
Figure 3:
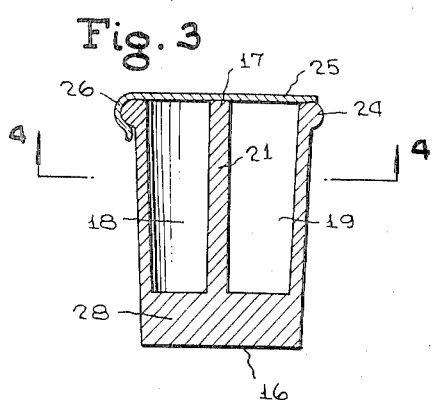
Figure 3 is a cross sectional view on the line 3—3 of Figure 2.

With continued reference to the drawing the numeral 10 represents a vacuum bottle enclosed in a casing 11 and having a neck 12 terminating in a mouth 13 enclosed by a cover cap 14 detachably secured at one end to the casing 11 near the end of the latter adjacent the bottle mouth. A cork or stopper 15 is seated in the mouth of the bottle and disposed within the cover cap 14.

The stopper 15 comprises a body of suitable resilient material, such as cork or rubber, of circular cross sectional shape and tapered from one end to the other, the intermediate portion of the cork having a size substantially equal to the size of the bottle mouth 13. The stopper body 15 has flat end walls 16 and 17 and is hollowed out interiorly to provide two chambers 18 and 19 opening to the larger end of the body and extending from the larger end of the body to a location spaced from the smaller end thereof.

The chamber 18 is of substantially semicircular cross sectional shape, while the chamber 19 has a cross sectional shape approximately mid-way between a semicircular and a quarter circular shape leaving at one end thereof a blank or solid area 20 on the larger end of the body, such blank area having the shape of an area representing the difference between the area of the chamber 19 and a semicircular area similar to the cross sectional area of the chamber 18.

The chambers 18 and 19 are separated by a partition 21 which constitutes an integral part of the stopper body and has a thickness sufficient to reinforce the walls provided by the portions of the body extending around the curved surfaces of the chamber and to maintain the body in a firm condition. The body walls 22 and 23 extending around the curved sides of the chambers 18 and 19 respectively, also have a thickness sufficient to maintain the stopper in a firm and efficient condition.

An annular external bead 24 of substantially semicircular cross sectional shape extends around the body at the larger end thereof and a cover is placed on the larger end of the body in closing relationship to the open ends of the chambers 18 and 19.

The cover comprises a flat metal disc 25 of circular shape and tongues 26 projecting from the periphery of the disc at angularly spaced apart locations therearound and curved around the beads 24 to secure the disc to the body while permitting rotation of the disc relative to the body.

The disc 25 is provided with a perforated area 27 somewhat smaller than the open end areas of the chambers 18 and 19 and smaller than the blank area 20 on the larger end of the stopper body.

The disc 25 can be manually rotated relative to the body of the stopper 15 to place the perforated area 27 over either of the chambers 18 or 19 for the dispensing of either salt or pepper contained in the separate chambers or over the blank area 20 to preclude dispensing of either salt or pepper from the body.

The solid portion 28 of the stopper body between the inner ends of the chambers 18 and 19 and the smaller end of the body is sufficiently thick to provide a liquid tight seal between the cork and the mouth of the vacuum bottle and the partition 21 and chamber walls 22 and 23 are sufficiently thick to provide ample rigidity to the body for forcing the smaller end thereof into the bottle mouth.

Salt may be placed in one of the chambers, and pepper in the other, and these materials may be selectively dispensed, as desired, by removing the stopper from the bottle and rotating the cover to bring the perforated area thereof over the proper chamber.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination, a bottle having a mouth, a cover cap removably engaged on said bottle around said mouth, said cap having a closed end wall axially spaced from said mouth, a hollow resilient body having an inner end and an outer end, said inner end being smaller than the outer end and being compressibly engaged in the bottle mouth, said body having at least one condiment chamber opening through the outer end of the body, a closure disc mounted on the outer end of the body, and means on the endwall of the cap engaging said body and removably securing said body to said endwall.

2. In a bottle cap having an end wall and a side wall, a body smaller in diameter than said cap having an outer end and an inner end, said outer end having a closure provided with perforations for discharging material from the interior of said body, and means on said cap removably securing said outer end of the body to the cap end wall with said closure engaging the end wall and with the end wall serving as closure means for said perforations.

3. In a bottle cap having an end wall and a side wall, a body smaller in diameter than said cap having an outer end and an inner end, said outer end having a closure provided with perforations for discharging material from the interior of said body, and means on said cap removably securing said outer end of the body to the cap end wall with said closure engaging the end wall and with the end wall serving as closure means for said perforations, in combination with a container having a reduced neck terminating in a mouth, said cap side wall having a free edge removably connected to the container around said neck and the inner end of said body being removably engaged in and closing said mouth.

References Cited in the file of this patent

UNITED STATES PATENTS

| | | |
|---|---|---|
| 734,165 | Drewery | July 21, 1903 |
| 807,005 | Wildman et al. | Dec. 12, 1905 |
| 854,792 | Bartlett | May 28, 1907 |
| 937,049 | Callahan | Oct. 19, 1909 |
| 1,002,293 | McGrann | Sept. 5, 1911 |
| 1,219,385 | Evans | Mar. 13, 1917 |
| 1,346,007 | De Aguiar | July 6, 1920 |
| 1,569,648 | Tormo | Jan. 12, 1926 |
| 1,826,539 | Harris | Oct. 6, 1931 |
| 1,938,430 | Kennedy | Dec. 5, 1933 |
| 1,952,016 | Kreidler | Mar. 20, 1934 |
| 2,199,732 | Antonson | May 7, 1940 |
| 2,392,602 | Luger | Jan. 8, 1946 |
| 2,559,168 | Numbers | July 3, 1951 |